United States Patent [19]
Kurahashi et al.

[11] Patent Number: 5,498,349
[45] Date of Patent: Mar. 12, 1996

[54] FILTRATION CONCENTRATION APPARATUS AND METHOD

[75] Inventors: Yoichi Kurahashi, Aichi; Yoshifumi Usui, Gifu; Kazuhiko Yagishita; Aisaburo Yagishita, both of Aichi, all of Japan

[73] Assignee: Kabushiki Kaisha Sanshin Seisakusho, Aichi, Japan

[21] Appl. No.: 191,695

[22] Filed: Feb. 4, 1994

[30] Foreign Application Priority Data

Feb. 8, 1993 [JP] Japan ................................. 5-019990
Feb. 8, 1993 [JP] Japan ................................. 5-019991

[51] Int. Cl.6 .................................................. B01D 29/66
[52] U.S. Cl. ................................... 210/798; 210/411
[58] Field of Search ................................ 210/798, 108, 210/411, 412, 416.1

[56] References Cited

U.S. PATENT DOCUMENTS 4,055,500 10/1977 Parker ................................. 210/412
4,517,086 5/1985 Romey et al. ....................... 210/416.1
4,874,533 10/1989 Boze et al. .......................... 210/411

Primary Examiner—Ivars Cintins
Attorney, Agent, or Firm—Lowe, Price, LeBlanc & Becker

[57] ABSTRACT

A filtration concentration apparatus and method by which a high operation efficiency of a filter is assured are disclosed. The filtration concentration apparatus comprises an original liquid intake path interconnecting a primary side of a pump and an original liquid storage tank, an original liquid supply path interconnecting a secondary side of the pump and an original liquid chamber of a filter, an original liquid return path interconnecting the secondary side of the pump and the storage tank, an original liquid recovery path interconnecting the original liquid chamber and the primary side of the pump, a liquid discharge path interconnecting a bottom portion of the original liquid chamber and a waste liquid tank, and a control unit for controlling the recovery path to open when the intake path and the supply path are open and controlling the intake path and the supply path to close when the recovery path and the return path are open. A filtering step of feeding original liquid under pressure into the filter by the pump and a backwashing step of sucking original liquid from the filter by the pump are performed alternately and repetitively.

5 Claims, 2 Drawing Sheets

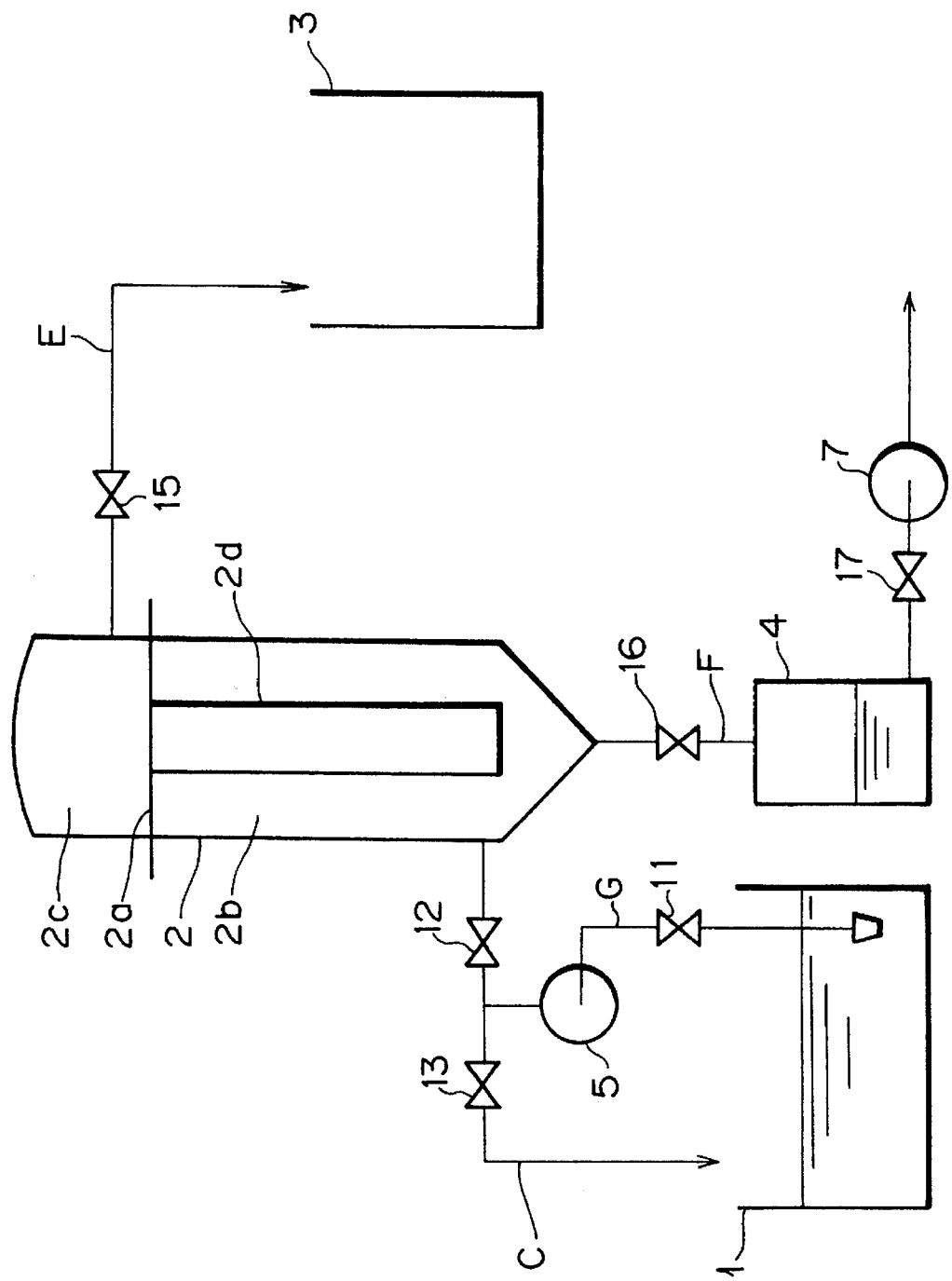

5,498,349

FILTRATION CONCENTRATION APPARATUS AND METHOD

BACKGROUND OF THE INVENTION

1. Field of the Invention

This invention relates to an apparatus for and a method of filtering suspension to separately recover filtrate and concentrated suspension, and more particularly to a filtration concentration apparatus and method which are improved in efficiency in removing filter cake accumulated on a filter material to assure a high filtration operation efficiency.

2. Description of the Prior Art

A vertical filter is known as an apparatus for filtering and concentrating a large amount of suspension. The vertical filter includes a tubular filter material in an original liquid chamber at a lower location and has a filtrate chamber provided at an upper location and communicated with the inside of the tubular filter material. In order to filter and concentrate original liquid using the filter, the original liquid is pressurized by a pump or a like element and supplied into the original liquid chamber while filtrate is recovered from the filtrate chamber. When filter cake is accumulated around the filter material and consequently the filtration efficiency is deteriorated, supply of the original liquid is stopped first, and then a waste liquid pipe connected to a lower portion of the original liquid chamber is opened to discharge the original liquid while pressurized air is simultaneously supplied, if necessary, into the filtrate chamber to cause the filtrate in the filtrate chamber to flow reversely to backwash the filter material. Thus, liquid containing filter cake exfoliated from the filter material is sent by way of the waste liquid pipe to a waste liquid tank provided separately to restore the filtration efficiency.

With the filtration concentration method described above, however, since the filtration operation is stopped and a washing reconditioning operation of the filter material is performed when filter cake is accumulated on the filter material, when it is tried to process original liquid having a high suspended substance concentration, the filtering step must be interrupted frequently. Consequently, not only the time required for the backwashing step but also the time required for change-over between the steps is increased as much, and accordingly, there is a problem in that the operation efficiency of the filter is deteriorated.

On the other hand, a countermeasure to increase the pressure of air to be supplied into the filtrate chamber to raise the reverse flow rate of the filtrate is conventionally employed in order to reduce the time required for the filter material backwashing step. However, the countermeasure is disadvantageous in that it has an economical restriction since the apparatus must have a high pressure resisting property when the pressure in the filtrate chamber is high and besides that there is a limitation in reduction of time and the filter material is liable to be damaged.

SUMMARY OF THE INVENTION

It is an object of the present invention to provide a filtration concentration apparatus and method by which a high operation efficiency of a filter is assured.

In order to attain the object described above, according to the present invention, the time required for change-over between a filtering step and a backwashing step upon operation of a filter is reduced and the backwashing step itself is simplified.

In particular, according to an aspect of the present invention, there is provided a filtration concentration apparatus, which comprises an original liquid storage tank, a filter having an original liquid chamber and a filtrate chamber partitioned by a filter material, a filtrate storage tank, a waste liquid tank, an original liquid pump, an original liquid intake path interconnecting a primary side of the original liquid pump and the original liquid storage tank, an original liquid supply path interconnecting a secondary side of the original liquid pump and the original liquid chamber, an original liquid return path interconnecting the secondary side of the original liquid pump and the original liquid storage tank, an original liquid recovery path interconnecting the original liquid chamber and the primary side of the original liquid pump, a filtrate recovery path interconnecting the filtrate chamber and the filtrate storage tank, a liquid discharge path interconnecting a bottom portion of the original liquid chamber and the waste liquid tank, and means for controlling the original liquid recovery path to open when the original liquid intake path and the original liquid supply path are open and controlling the original liquid intake path and the original liquid supply path to close when the original liquid recovery path and the original liquid return path are open.

According to another aspect of the present invention, there is provided a filtration concentration method, which comprises the steps of filtering, using the filtration concentration apparatus, the original liquid under pressure by feeding from an original liquid storage tank to a filter by way of an original liquid intake path and an original liquid supply path by an original liquid pump to recover the filtrate into an filtrate storage tank, backwashing the original liquid by sucking from an original liquid chamber by way of an original liquid recovery path and an original liquid return path by the original liquid pump to exfoliate filter cake from the filter material with the reversely flowing filtrate and recover at least part of the original liquid, in which the filter cake is mixed, into the original liquid storage tank, and repeating the two steps alternately and successively. Preferably, the filtration concentration method further comprises the step of opening, while the filtering step is proceeding or the original liquid pump remains inoperative after the filtering step and the backwashing step are repeated alternately and successively by a plurality of times, the liquid discharge path to allow at least part of the concentrated filter cake liquid to be discharged from the bottom portion of the original liquid chamber into the waste liquid tank.

According to a further aspect of the present invention, there is provided a filtration concentration apparatus, which comprises an original liquid storage tank, a filter having an original liquid chamber and a filtrate chamber partitioned by a filter material, a filtrate storage tank, a waste liquid tank, an original liquid supply path interconnecting the original liquid pump and the original liquid chamber, an original liquid pump interposed in the original liquid supply path, a filtrate recovery path interconnecting the filtrate chamber and the filtrate storage tank, a liquid discharge path interconnecting a bottom portion of the original liquid chamber and the waste liquid tank, and a suction pump for decompressing the waste liquid tank to remove contents of the waste liquid tank.

According to a still further aspect of the present invention, there is provided a filtration concentration method, which comprises the steps of filtering, using the filtration concentration apparatus, the original liquid under pressure by feeding from an original liquid storage tank into a filter by way of an original liquid supply path to recover the filtrate into a filtrate storage tank, and opening, while the filtering step is continuing, a liquid discharge path suddenly to allow concentrated filter cake liquid to be discharged rapidly from a bottom portion of an original liquid chamber into a waste liquid tank, which is decompressed in advance by said intake pump, and cause filter cake to be exfoliated from the filter material with the filtrate which is flowed reversely from a filtrate chamber, and then closing said liquid discharge path to restore the filtering operation.

With the filtration concentration apparatus and methods, the backwashing step can be entered only by changing over the paths, particularly valves interposed in the paths, or by opening the liquid discharge path, particularly a valve interposed in the liquid discharge path, while the original liquid pump is operating to perform the filtering step, and the filtering step can be entered only by changing over the paths or the valves or by closing the liquid discharge path or the valve for the liquid discharge path. Accordingly, by repeating the operation of performing backwashing for a short period of time to restore the filtration efficiency while filter cake is accumulated but in a small amount and backwashing of the filter material is still easy, the operation efficiency of the filter can be improved remarkably in continuous operation over a long period of time.

In particular, with the filtration concentration method, since filtering and backwashing can be performed alternately and successively while the original liquid pump remains operative, the waiting time upon changing over between the filtering step and the backwashing step is unnecessary, and consequently, the ratio of the substantial filtering time to the operation time of the filter, that is, the operation efficiency of the filter, can be improved remarkably. Further, since the operation efficiency is not deteriorated very much even if backwashing for a short period of time is performed frequently, the continuous operation time of the filter can be increased remarkably, and consequently, a high filtering capacity is exhibited comparing with the scale of the apparatus.

Further, with the filtration concentration apparatus, since the frequency of starting operations of the original liquid pump can be reduced remarkably, the power dissipation upon starting is reduced, and also the capacity of the power source for the original liquid pump is reduced, which is economical and assures an increased life of the filtration concentration apparatus. Further, since pressurized air need not be introduced into the filtration concentration apparatus upon backwashing, an economical apparatus which eliminates the necessity of a pressure resisting design can be constructed. Besides, since an excessively high filtering pressure need not be applied, possible damage to the filter material is reduced.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a similar view but showing another filtration concentration apparatus according to a second preferred embodiment of the present invention.

DESCRIPTION OF THE PREFERRED EMBODIMENTS

Figure 1:
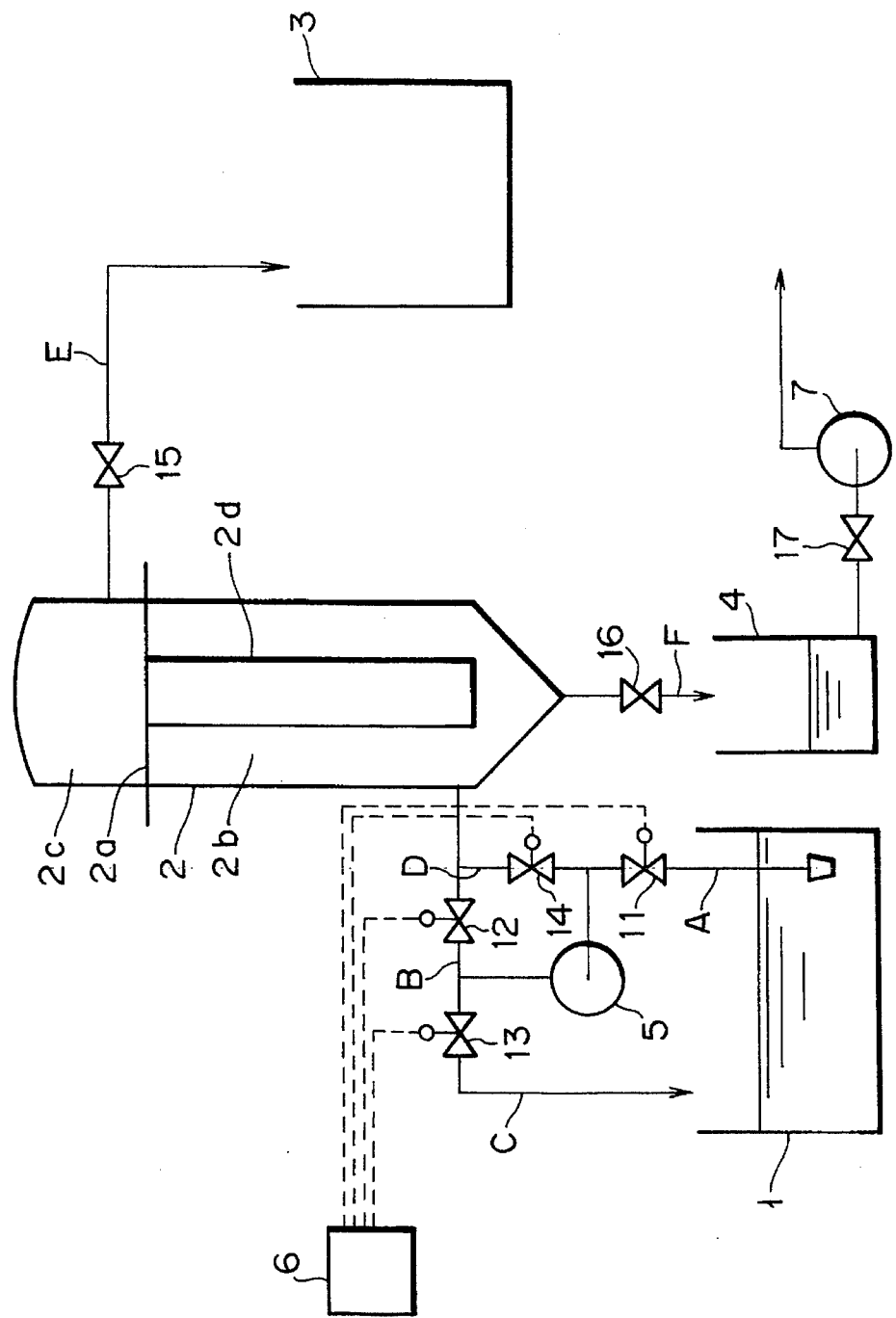
FIG. 1 is a diagrammatic view of a filtration concentration apparatus showing a preferred embodiment of the present invention.

Referring first to FIG. 1, there is shown a filtration concentration apparatus according to a preferred embodiment of the present invention. The filtration concentration apparatus shown includes an original liquid storage tank 1, a filter 2, a filtrate storage tank 3 and a waste light tank 4. The filter 2 includes a partition plate 2a located at a vertically central portion thereof and has an original liquid 2b formed below the partition plate 2a and a filtrate chamber 2c formed above the partition plate 2a. A tubular filter material 2d is suspended on the partition plate 2a, and the inside of the filter material 2d is communicated with the filtrate chamber 2c.

The primary side of an original liquid pump 5 is communicated with the original liquid storage tank 1 by way of an original liquid intake path A, and the secondary side of the original liquid pump 5 is communicated with the original liquid chamber 2b by way of an original liquid supply path B. Further, an original liquid return path C is branched from the original liquid supply path B for returning the original liquid to the original liquid storage tank 1, and an original liquid recovery path D for sucking the liquid in the original liquid chamber 2b is communicated with the primary side of the original liquid pump 5. The original liquid intake path A, the original liquid supply path B, the original liquid return path C and the original liquid recovery path D have valves 11, 12, and 14 interposed therein, respectively, so that they are individually put into a communicating condition or a non-communicating condition as the respective valves 11 to 14 are opened or closed by a control unit 6.

Filtrate is fed from the filtrate chamber 2c into the filtrate storage tank 3 by way of a filtrate recovery path E in which a valve 15 is interposed, and waste liquid is dropped from the bottom of the original liquid chamber 2b into the waste liquid tank 4 by way of a liquid discharge path F in which a valve 16 is interposed. Waste liquid in the waste liquid tank 4 is fed out to a waste liquid processing apparatus not shown by a waste liquid pump 7 which is connected to the waste liquid tank 4 by way of a valve 17.

In the filtration concentration apparatus constructed in such a manner as described above, in order to perform a filtering step for original liquid, the original liquid intake path A and the original liquid supply path B are opened and the original liquid recovery path D is closed by the control unit 6, and in this condition, the liquid discharge path F is closed while the filtrate recovery path E is opened and the original liquid pump 5 is rendered operative. Consequently, the original liquid in the original liquid storage tank 1 is fed into the original liquid chamber 2b, and the filtrate after filtered by the filter material 2d is recovered from the filtrate chamber 2c, which has been put into an accumulated pressure condition, into the filtrate storage tank 3 by way of the filtrate recovery path E. In this instance, the original liquid return path C may be open a little so as to allow part of the original liquid to return to the original liquid storage tank 1 in order to adjust the filtration rate.

As the filtering step is continued in this manner, filter cake is deposited on the filter material 2d and gradually deteriorates the filtration rate. Therefore, the original liquid return path C is restricted to decrease the returning amount of the original liquid so that the internal pressure of the original liquid chamber 2b may be increased and the filtration rate may not be decreased. However, in the present invention, a next backwashing step should be performed before the deposited amount of the filter cake becomes very great.

In the backwashing step in the present invention, while the filtering step described above continues, that is, while the original liquid pump 5 is operating, the original liquid intake path A and the original liquid supply path B are closed and simultaneously the original liquid return path C and the original liquid recovery path D are opened, and the original liquid in the original liquid chamber 2b is sucked by the original liquid pump 5 and discharged into the original liquid storage tank 1. Consequently, the filtrate in the filtrate chamber 2c in an accumulated pressure condition flows reversely into the original liquid chamber 2b through the filter material 2d, and thereupon, filter cake on the filter material 2d is exfoliated and drops into the original liquid in the original chamber 2b. Then, part of the filter cake is mixed with the original liquid and returns to the original liquid storage tank 1, but the other part of the filter cake in the form of masses settles and is deposited on the bottom of the original liquid chamber 2b.

Since the time required for the filter cake on the filter material 2d to be exfoliated and settle in the major part thereof in this manner is usually less than 30 seconds, even if the settlement of the filter cake is not completed, the filtering step can be restarted immediately by opening the original liquid intake path A and the original liquid supply path B and closing the original liquid recovery path D again by means of the control unit 6 after lapse of a preset short backwashing time.

Although the filtering step and the backwashing step described above can be changed over successively only by changing over the flow paths while the original liquid pump 5 is operating, filter cake is deposited gradually on the bottom of the original liquid chamber 2b after such changing over operation is repeated. Therefore, in the present invention, while the filtering step is proceeding or while the original liquid pump 5 is inoperative, the liquid discharge path F is opened to discharge waste liquid, in which filter cake is contained, from the bottom of the original liquid chamber 2b into the waste liquid tank 4. The discharging time is sufficient only with approximately 10 seconds to the utmost while the filtering step is proceeding and consequently has little bad influence upon the filtering operation.

Referring now to FIG. 2, there is shown another filtration concentration apparatus according to a second preferred embodiment of the present invention. The filtration concentration apparatus shown is a modification to the filtration concentration apparatus described hereinabove with reference to FIG. 1 and includes an original liquid storage tank 1, a filter 2, a filtrate storage tank 3 and a waste light tank 4. The filter 2 includes a partition plate 2a located at a vertically central portion thereof and has an original liquid 2b formed below the partition plate 2a and a filtrate chamber 2c formed above the partition plate 2a. A tubular filter material 2d is suspended on the partition plate 2a, and the inside of the filter material 2d is communicated with the filtrate chamber 2c.

An original liquid pump 5 is interposed in an original liquid intake path G which communicates the original liquid storage tank 1 and the original liquid chamber 2b with each other by way of a pair of valves 11 and 12 and corresponds to the original liquid intake path A and the original liquid supply path B in the filtration concentration apparatus shown in FIG. 1, and an original liquid return path C is branched from the original liquid intake path G for returning the original liquid from a secondary side of the original liquid pump 5 to the original liquid storage tank 1 and has a valve 13 interposed therein. Meanwhile, filtrate is fed from the filtrate chamber 2c into the filtrate storage tank 3 by way of a filtrate recovery path E in which a valve 15 is interposed, and waste liquid is dropped from the bottom of the original liquid chamber 2b into the waste liquid tank 4 by way of a liquid discharge path F in which a discharge valve 16 is interposed. Waste liquid and gas in the waste liquid tank 4 are sucked by a waste liquid pump 7 in the form of a suction pump so that they are fed out to a waste liquid processing apparatus not shown. Accordingly, the waste liquid tank 4 is kept in a decompressed condition by operation of the suction pump 7 by way of a valve 17 interposed between the waste liquid tank 4 and the suction pump 7.

In the filtration concentration apparatus constructed in such a manner as described above, in order to perform a filtering step for original liquid, the original liquid pump 5 is rendered operative so that the original liquid in the original liquid storage tank 1 is fed into the original liquid chamber 2b by way of the original liquid supply path A, and the filtrate after filtered by the filter material 2d is recovered from the filtrate chamber 2c, which has been put into an accumulated pressure condition, into the filtrate storage tank 3 by way of the filtrate recovery path E. In this instance, the original liquid return path C may be open a little so as to allow part of the original liquid to return to the original liquid storage tank 1 in order to adjust the filtration rate.

As the filtering step is continued in this manner, filter cake is deposited on the filter material 2d and gradually deteriorates the filtration rate. Therefore, the original liquid return path C is restricted to decrease the returning amount of the original liquid so that the internal pressure of the original liquid chamber 2b may be increased and the filtration rate may not be decreased. However, in the present invention, a next backwashing step should be performed before the deposited amount of the filter cake becomes very great.

The backwashing step in the present invention is performed when the suction pump 7 operates to keep the waste liquid tank 4 in a decompressed condition while the filtering step described above continues, that is, while the original liquid pump 5 is operating with the discharge valve 16 closed. In particular, when the discharge valve 16 is opened suddenly while the filtering step continues, the original liquid in the original liquid chamber 2b is sucked into the waste liquid tank 4 by way of the liquid discharge path F, whereupon the original liquid chamber 2b is temporarily decompressed. Consequently, the filtrate in the filtrate chamber 2c in an accumulated pressure condition is flowed reversely into the original liquid chamber 2b through the filter material 2d, whereupon filter cake on the filter material 2d is exfoliated and drops into the original liquid in the original chamber 2b.

Thus, when the discharge valve 16 is closed after lapse of the time of a predetermined interval of time, for example, approximately 10 seconds, the backwashing step is completed, thereby entering back into the filtering step. In this instance, most of filter cake which has been exfoliated from the filter material 2d and is floating in the original liquid is in the form of masses and settles and is deposited on the bottom of the original liquid chamber 2b without sticking to the filter material 2d again. Accordingly, no trouble occurs when the next filtering step is performed. The filter cake settled in this manner is sucked and discharged into the waste liquid tank 4 as waste liquid mixed with the original liquid upon the next backwashing step.

The filtering step and the backwashing step described above can be changed over successively only by opening or closing the discharge valve 16 while the original liquid pump 5 is operating, and since little time is required for such changing over between the steps and also the backwashing time is very short, a bad influence is had little on filtering operation of the filtration concentration apparatus.

Having now fully described the invention, it will be apparent to one of ordinary skill in the art that many changes and modifications can be made thereto without departing from the spirit and scope of the invention as set forth herein.

What is claimed is:

1. A filtration apparatus comprising:

a liquid storage tank;

a filter housing having a liquid chamber and a filtrate chamber partitioned by a filter element;

a filtrate storage tank;

a waste liquid tank;

a liquid pump;

a liquid intake path interconnecting a primary side of said liquid pump and said liquid storage tank;

a liquid supply path interconnecting a secondary side of said liquid pump and said liquid chamber;

a liquid return path interconnecting the secondary side of said liquid pump and said liquid storage tank;

a liquid recovery path interconnecting said liquid chamber and the primary side of said liquid pump;

a filtrate recovery path interconnecting said filtrate chamber and said filtrate storage tank;

a liquid discharge path interconnecting a bottom portion of said liquid chamber and said waste liquid tank; and means for closing, while the liquid pump is in operation, said liquid recovery path and opening said liquid intake path and said liquid supply path for filtering the liquid, and closing said liquid intake path and said liquid supply path and opening said liquid recovery path and said liquid return path for backwashing the filter element.

2. A filtration method comprising the steps of:

filtering, using the filtration apparatus as claimed in claim 1, liquid with a filter element by feeding under pressure from the liquid storage tank to the filter housing through the liquid intake path and the liquid supply path with the liquid pump to recover the filtrate into the filtrate storage tank;

backwashing the filter element by sucking the liquid from the liquid chamber through the liquid recovery path and the liquid return path with said liquid pump to dislodge a settled cake from the filter element by reversing the direction of flow through the filter element and recovering at least a part of the liquid, in which a removed cake is mixed, into said liquid storage tank; and repeating said filtering and backwashing in an alternative manner.

3. A filtration method as claimed in claim 2, further comprising the step of opening, while the filtering is in progress or said liquid pump is not in the operating mode after the repetition of said filtering and backwashing, said liquid discharge path to allow at least a part of the removed cake accumulated at the bottom of said liquid chamber to be discharged from the bottom portion of said liquid chamber together with the liquid into said waste liquid tank.

4. A filtration apparatus comprising:

a liquid storage tank;

a filter housing having a liquid chamber and a filtrate chamber partitioned by a filter element;

a filtrate storage tank;

a waste liquid tank;

a liquid supply path interconnecting a liquid pump and said liquid chamber;

said liquid pump interposed in said liquid supply path;

a filtrate recovery path interconnecting said filtrate chamber and said filtrate storage tank;

a liquid discharge path interconnecting a bottom portion of said liquid chamber and said waste liquid tank; and a suction pump connected to said waste liquid tank by way of a valve interposed therebetween for decompressing said waste liquid tank to remove contents of said waste liquid tank.

5. A filtration method comprising the steps of:

filtering, using the filtration apparatus as claimed in claim 4, liquid by feeding under pressure from the liquid storage tank into the filter housing through the liquid supply path to recover the filtrate into a filtrate storage tank; and opening, while the filtering is in progress, a liquid discharge path suddenly to allow any removed cake accumulated at the bottom of said liquid chamber to be discharged rapidly from the bottom portion of said liquid chamber together with the liquid into said waste liquid tank, which is decompressed in advance by said suction pump, and then closing said liquid discharge path to restore the filtering operation.

* * * * *